US012783278B2

(12) United States Patent
Berman et al.

(10) Patent No.: US 12,783,278 B2
(45) Date of Patent: Nov. 3, 2026

(54) DISTRIBUTED SYSTEMS HAVING VERSIONED STORAGE REPLICA TABLES

(71) Applicant: HEWLETT PACKARD ENTERPRISE DEVELOPMENT LP, Spring, TX (US)

(72) Inventors: Michael Berman, San Jose, CA (US); Keith Reynolds, Seattle, WA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 605 days.

(21) Appl. No.: 18/358,155

(22) Filed: Jul. 25, 2023

(65) Prior Publication Data

US 2025/0036441 A1 Jan. 30, 2025

(51) Int. Cl.
*G06F 9/455* (2018.01)

(52) U.S. Cl.
CPC ...... *G06F 9/45558* (2013.01); *G06F 9/45545* (2013.01); *G06F 2009/45583* (2013.01); *G06F 2009/45595* (2013.01)

(58) Field of Classification Search
CPC ............. G06F 9/45558; G06F 9/45545; G06F 2009/45583; G06F 2009/45595
See application file for complete search history.

(56) References Cited

U.S. PATENT DOCUMENTS 5,884,082 A 3/1999 Seidel et al.
9,092,238 B2 7/2015 Cavage et al.
10,187,479 B2 1/2019 Willmann
10,841,291 B2 11/2020 McClure
10,997,130 B2 5/2021 Yin et al.
11,240,334 B2 2/2022 Nassi et al.
11,487,451 B2 11/2022 Reed et al.
2008/0040565 A1* 2/2008 Rozas .................. G06F 12/145 711/163
2015/0019825 A1* 1/2015 Gao ....................... G06F 9/544 711/154

(Continued)

FOREIGN PATENT DOCUMENTS

WO WO2015034506 3/2015
WO WO2015034508 3/2015
WO WO2020070061 4/2020

*Primary Examiner* — Kenneth Tang
(74) *Attorney, Agent, or Firm* — Trop, Pruner & Hu, P.C.

(57) ABSTRACT

A process includes creating, by a kernel of a distributed system, entries in a storage replica table, which are associated with a guest physical memory address. The process includes storing, by the kernel, data in the entries associating the entries with respective versions of content for the guest physical memory address; storing, by the kernel, data in the entries associating the entries with respective stable storage block addresses; and storing, by the kernel, data in the entries associating the entries with respective real physical memory addresses. The process includes, responsive to a read request to read content associated with a first version of the versions, accessing, by the kernel, the storage replica table. The process includes, responsive to the accessing the storage replica table, identifying, by the kernel, a first entry of the entries associated with the first version. The first entry contains data associating the first entry with a first real physical memory address. The process includes reading, by the kernel, data from the first real physical memory address.

20 Claims, 10 Drawing Sheets

174

VERSIONED STORAGE REPLICA TABLE (SRT)

| | STABLE STORAGE BLOCK ADDRESS (404) | REAL PHYSICAL MEMORY ADDRESS (406) | GUEST PHYSICAL MEMORY ADDRESS (408) | VERSION (410) | STATUS (412) |
|---|---|---|---|---|---|
| 404-1 | [14, 0x3274] | [3, 0x123456] | 0x235678 | 4 | I |
| 404-2 | [12, 0x1456] | [2, 0x987654] | 0x675432 | 7 | I |
| 404-3 | [2, 0x9876] | [6, 0x438921] | 0x345987 | 7 | I |
| | ⋮ | ⋮ | ⋮ | ⋮ | ⋮ |
| 404-M | [10, 0x4784] | [4, 0x582211] | 0x675432 | 8 | M |
| | ⋮ | ⋮ | ⋮ | ⋮ | ⋮ |
| 404-P | [8, Øx1786] | [7, Ø938456] | 0x453876 | 3 | I |

(56) References Cited

U.S. PATENT DOCUMENTS

| | | | | |
|---|---|---|---|---|
| 2019/0146803 | A1* | 5/2019 | Reed | G06F 12/0815<br>703/2 |
| 2020/0192799 | A1* | 6/2020 | Johns | G06F 12/1009 |
| 2021/0096898 | A1* | 4/2021 | Tsirkin | G06F 12/10 |
| 2021/0357294 | A1 | 11/2021 | Balcha | |
| 2021/0389883 | A1* | 12/2021 | Derryberry | G06F 11/2094 |
| 2022/0113911 | A1 | 4/2022 | Kuriata et al. | |
| 2022/0229688 | A1* | 7/2022 | Dang | G06F 12/0891 |

* cited by examiner

174

| | VERSIONED STORAGE REPLICA TABLE (SRT) | | | | |
|---|---|---|---|---|---|
| | STABLE STORAGE BLOCK ADDRESS (404) | REAL PHYSICAL MEMORY ADDRESS (406) | GUEST PHYSICAL MEMORY ADDRESS (408) | VERSION (410) | STATUS (412) |
| 404-1 | [14, 0x3274] | [3, 0x123456] | 0x235678 | 4 | I |
| 404-2 | [12, 0x1456] | [2, 0x987654] | 0x675432 | 7 | I |
| 404-3 | [2, 0x9876] | [6, 0x438921] | 0x345987 | 7 | I |
| | ⋮ | ⋮ | ⋮ | ⋮ | ⋮ |
| 404-M | [10, 0x4784] | [4, 0x582211] | 0x675432 | 8 | M |
| | ⋮ | ⋮ | ⋮ | ⋮ | ⋮ |
| 404-P | [8, Øx1786] | [7, Ø938456] | 0x453876 | 3 | I |

FIG. 4

DISTRIBUTED SYSTEMS HAVING VERSIONED STORAGE REPLICA TABLES

BACKGROUND

A distributed system includes multiple computer nodes that can run in parallel to provide increased processing throughput, as compared to a single node system. The computer nodes of the distributed system can execute respective programs that are to perform corresponding operations.

BRIEF DESCRIPTION OF THE DRAWINGS

FIG. 4 depicts a versioned SRT according to an example implementation.

DETAILED DESCRIPTION

Figure 1:
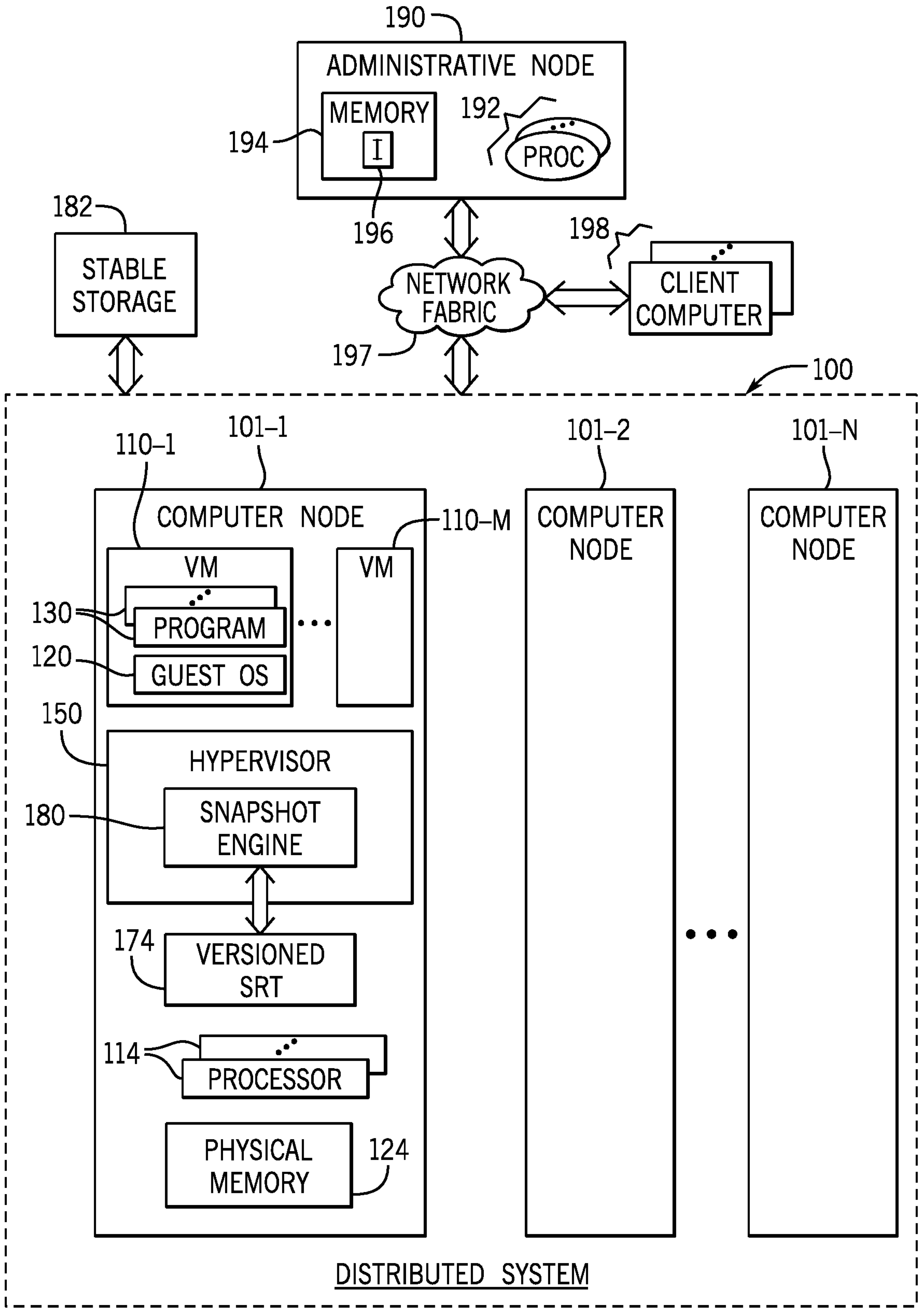
FIGS. 1 and 3 are block diagrams of virtualized distributed systems with versioned storage replica tables (SRTs) according to example implementations.

A computer system may have the capability to acquire snapshots of its state at different times. Such snapshots may be beneficial for a number of different reasons, such, for example, allowing a computer system state to be rolled back in time for such purposes as performing an audit or overcoming data corruption, data loss, data entry errors, a system malfunction, or the effects of a security attack. Snapshots of a non-volatile memory content of the computer system may be stored in blocks of stable storage. In one conventional approach, restoring a computer system state with a snapshot involves looking up a stable storage block address of the snapshot and reading the snapshot from stable storage. Reading content from stable storage, however, involves the use of input/output (I/O) operations, which may be costly from a performance standpoint. In accordance with example implementations that are described herein, instead of relying solely on stable storage for snapshots, a distributed system stores snapshots in both stable storage and physical memory. Through the use of a versioned storage replica table, a kernel of the distributed system may identify whether a particular snapshot is stored in physical memory and if the snapshot is stored in physical memory, retrieve the snapshot from physical memory in lieu of using block I/O operations to retrieve the snapshot from stable storage. Therefore, with this approach, in-memory transfers, which consume considerably less time and resources than I/O transactions, may be advantageously used to retrieve snapshots when the snapshots are available in memory.

More specifically, in accordance with example implementations, a kernel of the distributed system may store and maintain a versioned storage replica table in the real physical memory of the system. Entries of the versioned storage replica table associate a particular memory location (e.g., a virtualized, or abstracted, memory location such as a guest physical memory) with a set of physical memory addresses (e.g., real physical memory addresses) that store corresponding versioned snapshots (e.g., snapshots taken at different times). Each entry stores, for example, data identifying a memory location, a snapshot version identifier identifying the snapshot version for the memory location, a physical memory address where the snapshot for the memory location is stored and a block address in stable storage where the snapshot is stored. For purposes of retrieving a snapshot of a memory location corresponding to a particular snapshot, the kernel may first check the versioned storage replica table to see if the snapshot is stored in physical memory and if so, retrieve the snapshot using an in-memory transfer in lieu of retrieving the snapshot from stable storage.

The distributed system may be a virtualized distributed system (which may also be referred to as a "virtualized distributed computer system"). A virtualized distributed system includes a collection of physical computer nodes and one or multiple virtual machines (VMs) that are hosted by (i.e., "run on") the computer nodes. Each VM has an associated guest operating system. In a virtualized distributed system according to one type, one or multiple VMs may run on each computer node of the system. In a virtualized distributed system according to another type, a single VM may run across the computer nodes of the system. This latter virtualized distributed system may be referred to as a software-defined server, or "SDS."

A virtualized distributed system may contain memories that may be categorized according to three types: a guest virtual memory (GVM), which corresponds to a GVM address space; a guest physical memory (GPM), which corresponds to a GPM address space; and a real physical memory (RPM), which corresponds to an RPM address space. The GVM is the memory that is seen by applications, or programs, which run a guest operating system due to a GVM abstraction that is provided by the guest operating system. For purposes of providing the GVM abstraction, the guest operating system maps GVM addresses to GPM addresses.

Although, due to the GVM abstraction, the programs perceive the GVM address space as being linear, this is an illusion. The guest operating system views GPM as being actual, or real, physical memory. However, the GPM is virtual. Moreover, although the GPM address space appears to the guest operating system to be linear, this is also an illusion.

RPM refers to actual, or real, physical memory, which corresponds to actual physical memory devices. As an example, at least some of the physical memory devices of a virtualized distributed system may be installed on motherboards of the computer nodes to form at least part of the RPM of the distributed system. As other examples, at least some of the physical memory devices may reside in one or multiple remote, pooled memory appliances, or, in general, on any other data storage device that is addressable by the virtualized distributed system. RPM may be provided by any of a number of different memory devices that may correspond to one or multiple memory or storage technologies, including random access memory (RAM), dynamic RAM (DRAM), static RAM (SRAM), flash memory, memristor memory, phase change memory, persistent memory, magnetic media technologies.

An intermediate virtualization layer of the virtualized distributed system may manage a mapping between the GPM and RPM address spaces to provide a GPM abstraction. For some virtualized distributed systems, the virtualization layer may be provided by one or multiple virtual machine monitors (VMMs), or hypervisors. For an SDS, the intermediate virtualization layer may be provided by a distributed hyper-kernel that is formed by hyper-kernel instances that are located on respective computer nodes of the SDS. The GPM abstraction allows physical memory to be addressable by a guest operating system as if the physical memory was byte and/or page addressable, such as a physical memory that is formed from memory devices that are mounted on a motherboard. A hypervisor and a hyper-kernel are examples of intermediate virtualization layer kernels.

The intermediate virtualization layer may create snapshots of GPM content and store the snapshots in a persistent storage subsystem. In this context, a "snapshot" refers to a unit of data existing at a particular point in time. In an example, a snapshot of a GPM content may be a page of data stored at a particular GPM address at a particular time. In an example, the persistent storage may be a stable storage. In this context, "stable storage" refers to a storage that is constructed to allow atomic writes. When an atomic write occurs to stable storage, the stable storage can immediately provide back either the data that was written or the data that was to be overwritten by the write. For a number of different reasons, it may be desirable to access snapshots that correspond to prior GPM content. In an example, a page stored at a particular GPM address may have been modified or deleted (e.g., modified intentionally or unintentionally via user action, subjected to a security attack, corrupted, or changed due to other factors), and it may be desired to roll back the content at the GPM address to a version corresponding to a previously captured snapshot. In other examples, snapshots of GPM content may be analyzed for purposes of auditing content changes or correlating changes to system events.

In accordance with example implementations that are described herein, a virtualized distributed system maintains and uses a table (called a "versioned storage replica table" or "versioned SRT" herein) that identifies RPM addresses at which snapshots for GPM addresses are stored. In an example, a versioned SRT may contain entries that are associated with corresponding GPM addresses. The versioned SRT may contain multiple entries for a given GPM address, and each of these entries may correspond to a different snapshot for the GPM address. In an example, an SRT entry may contain information that associates a particular GPM address with a particular snapshot version. The SRT entry may further associate the particular GPM address with an RPM address where the snapshot corresponding to the snapshot version is stored, and the SRT entry may further associate the particular GPM address with a block address of stable storage where the snapshot corresponding to the snapshot version is stored.

As a more specific example, the data for a versioned SRT may be organized in rows, and each row may contain data representing a corresponding SRT entry that is associated with a GPM address. Columns of the SRT may correspond to a GPM address, a stable storage block address, an RPM address and a snapshot version identifier.

An intermediate virtualization layer kernel of a virtualized distributed system, in accordance with example implementations, handles, or processes, requests to read a snapshot for a particular GPM address and a particular snapshot version as follows. First, the kernel searches the versioned SRT for purposes of identifying the particular SRT entry that corresponds to the particular GPM address and the requested snapshot version. The kernel may then read the snapshot from the RPM address in the identified SRT entry, in lieu of, for example, retrieving the snapshot from stable storage using an expensive I/O operation.

In accordance with example implementations, a versioned SRT may serve dual purposes for the virtualized distributed system: the versioned SRT may be used both for purposes of identifying RPM addresses at which snapshots are stored, and the versioned SRT may also be used to rapidly reboot a computer node, which has experienced a software crash. Unlike hardware failures, software and key application failures in a computer system (such as a virtualized distributed system, for example) can happen virtually instantaneously, resulting in a software crash (e.g., a software crash that is initiated by panic). There may be no opportunity for the operating system to undertake corrective action to cure the reason for the crash or prevent the crash, as the operating system may immediately restart after the software crash.

A virtualized distributed system may have a relatively large memory, which may be beneficial for any of a number of reasons, such as supporting in-memory databases, machine learning, fast analytics support and decision making support. Moreover, a large memory may be beneficial for allowing programs to be scaled up for use on the virtualization distributed system without incurring significant program modifications. A larger memory size, may, however, potentially add to the time for a guest operating system of the distributed system to reboot in the event of a software crash.

An unvirtualized computer system, when its operating system crashes, may clear all physical addressable memory and reset the entire state of the memory to a known state, losing all intermediate state of the memory, which existed prior to the crash. As the physical memory is reinitialized, when the operating system reboots, the operating system may reload physical memory by requesting data from a stable storage, such as a solid state drive (SSD), a hard disk drive, or other stable storage stored locally or remotely. Rebuilding memory contents to arrive back at the operating point/state where the computer system was prior to the crash and operating at previous performance levels, may take a significant amount of time, especially for a large memory system.

For a virtualized distributed system, even if a guest operating system and applications running on the guest operating system crash, this does not mean that the content of the RPM prior to the crash is lost. The intermediate virtualization layer may intercept, or trap, guest operating system I/O requests to retrieve blocks of stable storage and use the SRT to determine whether copies, or clones, of the blocks exist in RPM. If a block happens to have a clone in RPM, then the intermediate virtualization layer may response to the I/O request by a remapping operation (e.g., remapping the current RPM address of the GPM address associated with the I/O request to that the GPM is now mapped to the RPM address of the clone), instead of performing an expensive (from the standpoint of time and resources) process of retrieving the block from stable storage. Remapping GPM addresses to RPM addresses to avoid I/O accesses allows for a faster reboot of the guest operating system.

In accordance with example implementations, the snapshot version identifier may be an integer and is referred to herein as a "snapshot version number." In an example, the snapshot version numbers are monotonically increasing such that a larger snapshot version number for a given GPM address corresponds to a snapshot version taken at a later time, relative to a smaller snapshot version for the GPM address, which corresponds to a snapshot taken at an earlier time. Snapshot version identifiers (e.g., timestamps, alphanumeric combinations and other identifiers) other than integers may be used, in accordance with further implementations.

As a more specific example, FIG. 1 depicts a virtualized distributed system 100 (also called a "distributed system" herein) in accordance with some implementations. The virtualized distributed system 100 may be used for any of a number of purposes, such as, for example, providing database management system service, providing high performance computing (HPC) services, providing file sharing services, providing file management servers, providing big data analytics services, providing cloud services, providing data mining services, or another purpose.

As depicted in FIG. 1, in accordance with example implementations, the virtualized distributed system 100 may be part of a computer network that, in addition to the distributed system 100, includes multiple client computers 198 that communicate with the distributed system 100 via a network fabric 197. Moreover, the computer network may include one or multiple administrative nodes 190 that are coupled to the network fabric. The administrative node(s) 190 may issue commands related to setting up and managing the distributed system 100. The network fabric 197 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

As further depicted in FIG. 1, the distributed system 100 may be coupled to include one or multiple storage devices that collectively form a stable storage 182, which is constructed to allow atomic writes. When an atomic write occurs to the stable storage 182, the stable storage 182 can immediately provide back either the data that was written or the data that was to be overwritten by the write. In accordance with example implementations, the stable storage 182 may use a redundant array of inexpensive expensive disk (RAID) technology, such as mirroring or data striping with parity information. In accordance with example implementations, the stable storage 182 may employ block storage in which the data is organized as fixed blocks. As an example, the fixed blocks may have corresponding block addresses. In an example, the address for a particular block of stable storage may include a disk number and a logical block identifier. The storage devices of the stable storage 182 may be associated with any of a number of different storage technologies, including solid state drives (SSD) and spinning drives, and the storage devices may be accessed by the distributed system 100 locally or remotely via connection fabric, such as network fabric (e.g., the network fabric 197 or other network fabric) and/or backplane fabric.

In accordance with example implementations, the virtualized distributed system 100 includes N computer nodes 101 (example computer nodes 101-1, 101-2 and 101-N, being depicted in FIG. 1). Each computer node 101 of the virtualized distributed system 100 may include virtual machines (VMs). For example, the computer node 101-1 may include M VMs 110 (example VMs 110-1 and 110-M, being depicted in FIG. 1). Other computer nodes 101-2 to 101-N may have a different number or the same number M of VMs.

A "computer node," in the context used herein, refers to an electronic device with a processing resource that is capable of executing machine-readable instructions. Examples of computer nodes can include server computers (e.g., blade servers, rack-based servers or standalone servers), desktop computers, notebook computers, tablet computers, and other processor-based systems. Specific components for computer node 101-1 are illustrated in FIG. 1 and discussed herein. It is noted that the other computer nodes 101 may have similar components in accordance with example implementations. In accordance with some implementations, the computer nodes 101 may be homogenous, or have the same or similar components.

The computer node 101-1 includes a collection of physical processors 114 (a single processor or multiple processors). The collection of physical processors 114 may, in general, execute machine-readable instructions for purposes of forming software components of the computer node 101, such as the VMs 110 and a hypervisor 150. Moreover, the collection of processors 114 may execute software that is contained in the VMs 110, such as one or multiple applications, or programs 130, and a guest operating system 120. As used herein, a "collection" of items can refer to a single item or multiple items. A processor can include a microprocessor, a core of a multi-core microprocessor, a microcontroller, a programmable integrated circuit, a programmable gate array, or another hardware processing circuit. As more specific examples, the physical processor 114 may be a CPU core, a collection of CPU cores, a CPU semiconductor package (or "socket"), a GPU core, a collection of GPU cores or a GPU semiconductor package.

The computer node 101-1 also includes a physical memory 124, which can be implemented using a collection of physical memory devices. In general, the memory devices that form the physical memory 124, as well as other memories and storage media that are described are referenced herein, are examples of non-transitory machine-readable storage media (e.g., non-transitory storage media readable by a computer node 101-1 and/or readable by the virtualized distributed system 100). In accordance with example implementations, the machine-readable storage media may be used for a variety of storage-related and computing-related functions of the virtualized distributed system 100, such as, for example, storing machine-readable instructions, such as instructions that form instances of the software components of the computer node 101-1, including the hypervisor 150 and a snapshot engine 180 of the hypervisor 150, as further described herein. As another example, the storage-related and computing-related functions of the machine-readable storage media may include storing and providing access to data associated with computing functions performed by the computer node 101-1, such as storing parameters, initial datasets, intermediate result datasets, final datasets, and data describing jobs to be executed by the computer node 101-1. As other examples, the storage-related and computing-related functions of the machine-readable storage media may include storing and providing access to machine-readable instructions and data pertaining to an operating system, a baseboard management controller (BMC), drivers, applications, firmware, network processing, security intrusion detection, security intrusion prevention, access privilege management, cryptographic processing, firmware validation, driver validation, and/or other instructions. As yet other examples, the storage-related and computing-related functions of the machine-readable storage media may include storing and updating data representing tables, SRT tables, versioned SRT tables 174; mapping information; system management-related parameters, as well as storing and updating other data. As examples, the memory devices may include semiconductor storage devices, flash memory devices, memristors, phase change memory devices, magnetic storage devices, a combination of one or more of the foregoing storage technologies, as well as memory devices based on other technologies. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

For the specific example implementations of FIG. 1, the VM 110-1 includes the guest operating system 120 and applications, or programs 130, that are executable on the VM 110-1. Address mapping information may also be provided for the VM 110-1, which maps between GVM addresses of a GVM address space of the VM 110-1 and GPM addresses of a GPM address space. From the point of view of the guest operating system 120, the GPM is a physical memory. However, the GPM is actually a virtual memory and is an abstraction that is provided by the hypervisor 150. The hypervisor 150 is associated with an intermediate virtualization layer of the distributed system 100 and is one example of a "kernel" that manages and uses a versioned SRT 174, as further described herein.

The hypervisor 150 manages the sharing of the physical memory 124 of the computer node 101-1 among the VMs 110. The physical memory 124 corresponds to an RPM address space. The hypervisor 150 maps GPM addresses to RPM addresses for purposes of providing a GPM abstraction to the guest operating system 120. The other VMs 110-2 to 110-M may include components similar to the VM 110-1.

In accordance with example implementations, the hypervisor 150 includes a snapshot management engine (called a "snapshot engine 180" herein). As described further herein, the snapshot engine 180 uses and maintains the versioned SRT 174 for purposes of taking snapshots of content corresponding to GPM addresses, storing the snapshots in RPM and retrieving snapshots from RPM. In other examples, the snapshot engine 180 or a particular component thereof may be part of the computer node 101-1 but separate from the hypervisor 150.

As used here, an "engine" can refer to one or more circuits. For example, the circuits may be hardware processing circuits, which can include any or some combination of a microprocessor, a core of a multi-core microprocessor, a microcontroller, a programmable integrated circuit (e.g., a programmable logic device (PLD), such as a complex PLD (CPLD)), a programmable gate array (e.g., field programmable gate array (FPGA)), an application specific integrated circuit (ASIC), or another hardware processing circuit. Alternatively, an "engine" can refer to a combination of one or more hardware processing circuits and machine-readable instructions (software and/or firmware) executable on the one or more hardware processing circuits.

In accordance with example implementations, the snapshot engine 180 traps, or intercepts, writes requests that are provided by the guest operating system 120 and directed to storing content at snapshot-affiliated (or "snapshot protected") GPM addresses. In accordance with example implementations, different RPM addresses store snapshots (corresponding to different snapshot versions) for the same GPM address, and the snapshot engine 180 uses RPM copy-on-writes to prevent modifications to finalized, RPM-stored snapshots. For example, the most recently taken snapshot for a GPM address may be Snapshot A that is stored at RPM Address A. In this context, a "taken" snapshot (or "generated" snapshot) refers to a snapshot that is finalized, or immutable, and has been written to a block of stable storage 182.

Continuing the example, the GPM address may be mapped to RPM Address A. For a subsequent write request directed to the GPM address, because Snapshot A is immutable, the snapshot engine 180 may perform an RPM copy-on-write in which the snapshot engine 180 allocates a new RPM Address B for the GPM address, maps the GPM address to RPM address B, copies the content (i.e., Snapshot A) stored at RPM Address A to RPM Address B, and modifies the content now stored at RPM Address B in accordance with the write request. The content stored at RPM Address B represents a new Snapshot B under construction for the GPM address. Moreover, in connection with the copy-on-write operation, the snapshot engine 180 may create an entry in the versioned SRT 174 associating the GPM address with Snapshot B and associating the GPM address with RPM Address B. Depending on a snapshot generation policy, the write request to the GPM address may trigger the taking, or generation, of the next snapshot for the GPM address, which means that Snapshot B is immutable. If the write request to the GPM address triggers the taking of the next snapshot, then the snapshot engine 180 may, as further described herein, write Snapshot B stored at RPM Address B to stable storage 182 and modify the entry to the versioned SRT 174 (and corresponding to Snapshot B) to indicate that Snapshot B is immutable.

In the foregoing example, the snapshot generation policy provides a relatively fine-grained snapshot resolution, as every write to a snapshot-affiliated GPM address triggers the taking of another snapshot. In another example, the snapshot generation policy may provide a relatively coarser-grained snapshot resolution in which new snapshots are taken less often, and accordingly successive writes may modify content stored at an RPM address before a snapshot is taken. For example, continuing the example above for a relatively coarser-grained snapshot generation policy, the snapshot generation engine 180 may, in lieu of triggering the finalization of Snapshot B in response to the first write request, further modify the content stored at RPM Address B in accordance with one or multiple further write requests that are directed to the GPM address. As such, Snapshot B may be built based on Snapshot A and one or multiple subsequent writes. When a trigger (according to the snapshot generation policy) occurs, then Snapshot B is finalized (corresponding to the taking of Snapshot B), and the snapshot generation policy may then write the content stored at RPM Address B to stable storage 182 and modify the entry to the versioned SRT 174 (and corresponding to Snapshot B) to indicate that Snapshot B is immutable. The next write request to the GPM address causes the snapshot engine 180 to perform another RPM copy-on-write and repeat the process described above.

In accordance with example implementations, the snapshot engine 180 may further use the versioned SRT 174 to retrieve snapshots from RPM for purposes of rolling back the content for a particular GPM address to a snapshot that corresponds to a particular snapshot version. As described further herein, the retrieval of snapshots may be used for any of a number of reasons, including mirroring, auditing and security threat analyses. Because the versioned SRT 174 provides the snapshot engine 180 the ability to identify clones of snapshots, which are stored in RPM, the snapshot engine 180 may rapidly retrieve the snapshots and avoid costly I/O operations with stable storage 182.

In accordance with some implementations, each entry (also called "SRT entry" herein) of the versioned SRT 174 includes data that represents a 4-tuple, or quadruple. The quadruple, in accordance with example implementations, includes a GPM address, an RPM address, a stable storage block address, and a snapshot version number. At any given time, the versioned SRT 174 may contain multiple entries for a given GPM address, with each of these multiple SRT entries being associated with a different snapshot version number. Moreover, in accordance with example implementations, each SRT entry of the multiple SRT entries for a given GPM address has a different RPM address and a different block stable storage address.

In accordance with example implementations, the snapshot engine 180 may be configured to retrieve snapshots corresponding to a particular snapshot version number. In an example, if the versioned SRT 174 contains multiple SRT entries corresponding to multiple snapshot versions for a GPM address, the snapshot engine 180 may be configured to select the SRT entry corresponding to the most snapshot recent version (e.g., the largest snapshot version number) and retrieve a unit of data (e.g., a page) that corresponds to the RPM address contained in the selected SRT entry. In another example, the snapshot engine 180 may be configured to select an SRT entry corresponding to a snapshot version number other than the most recent number. For example, the versioned SRT 174 may contain SRT entries that correspond to five versions (corresponding to version numbers 5, 6, 7, 8 and 9) for a particular GPM address, and the snapshot engine 180 may be configured to select the SRT entry that corresponds to snapshot version number 7. Therefore, as an example, if the snapshot engine 180 traps a read request to read content (e.g., a page) from this GPM address, the snapshot engine 180 may read the SRT entry that corresponds to snapshot version number 7 and fulfill the read request based on the RPM address contained in this entry. In an example, the snapshot engine 180 may fulfill the read request by remapping the GPM address to the RPM address contained in the SRT entry. In another example, the snapshot engine 180 may fulfill the read request by reading content (e.g., a page) from the RPM address contained in the SRT entry and writing the content to the RPM address that is currently mapped to the GPM address.

Configuring the snapshot engine 180 to select a particular snapshot version identifier may be performed in any of a number of different ways, depending on the particular implementation. In an example, an administrative node 190 (e.g., a management server) may configure the snapshot engine 180 to retrieve snapshots corresponding to a particular snapshot version number. In a more specific example, one or multiple hardware processors 192 of the administrative node 190 may execute machine-readable instructions 196 (e.g., instructions that are stored in a memory 194 of the node) for purposes of providing a graphical user interface (GUI) through which a user (e.g., a system administrator) may select the snapshot version number.

In another example, a program 130 (e.g., a database management system application) may allow a user to select a particular snapshot version number for purposes of rolling back a state associated with the program 130 to a state that corresponds to the selected snapshot version number. In another example, a program 130 (e.g., a malware detection application or a malware prevent application) may configure the snapshot engine 180 to select content corresponding to multiple snapshot version numbers for purposes of comparing memory content changes over time to evaluate system behavior for purposes of detecting a security attack. In another example, a program 130 (e.g., a malware detection application or a malware prevent application) may configure the snapshot engine 180 to select content corresponding to multiple snapshot version numbers for purposes of auditing changes to the system 100. In another example, a client computer 198 may request content corresponding to particular snapshot version number.

Figure 2:
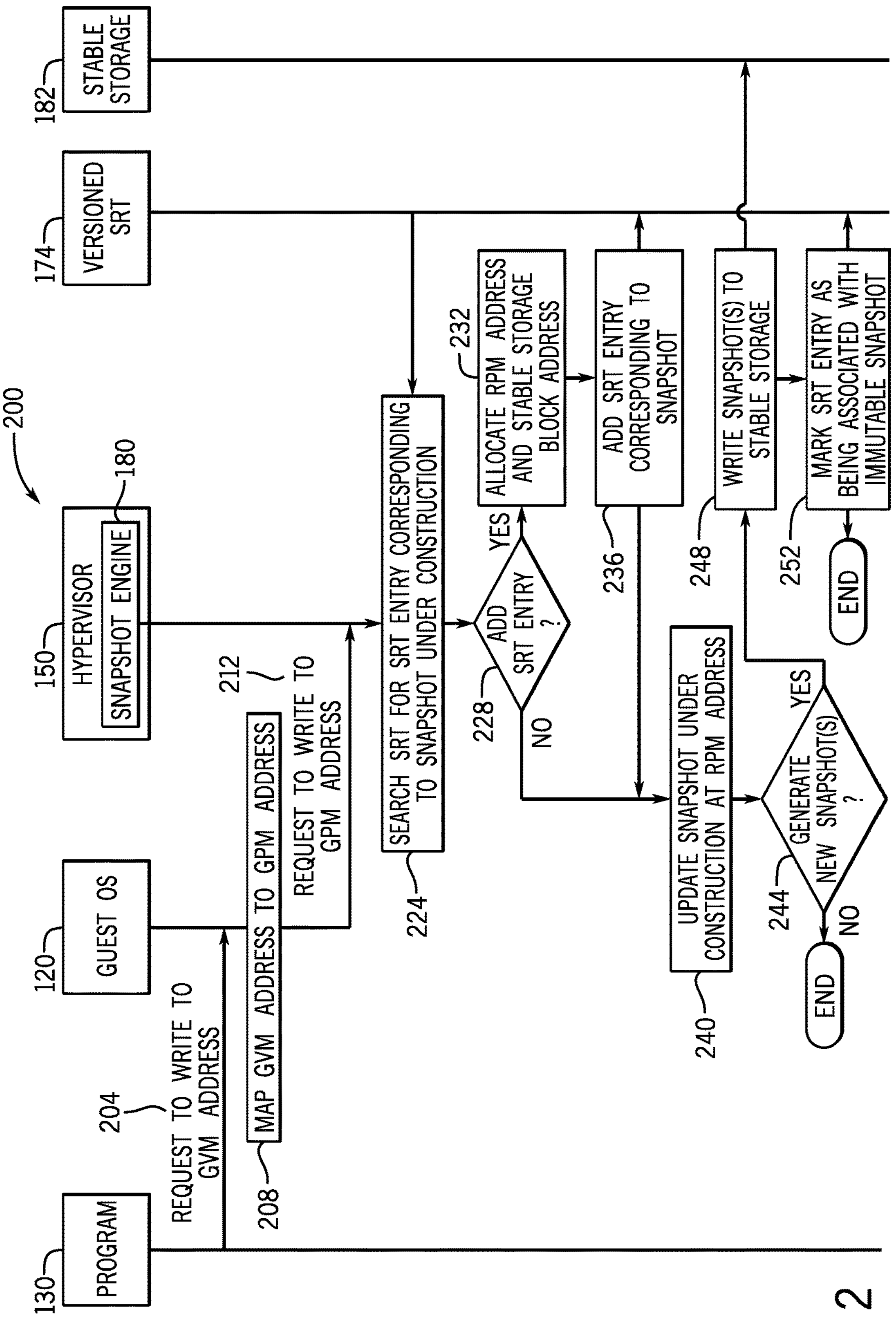
FIG. 2 is a flow diagram depicting a process used by the virtualized distributed system of FIG. 1 to respond to a write to a snapshot-affiliated guest physical memory (GPM) address according to an example implementation.

FIG. 2 depicts a process 200 used by a virtualized distributed system to process a write to a snapshot-affiliated GPM address, in accordance with example implementations. In an example, the process 200 may be performed by components of the virtualized distributed system 100 of FIG. 1. In another example, the process 200 may be performed by a virtualized distributed system 300 that is described below in connection with FIG. 3.

Referring to FIG. 2, the process 200 includes a program 130 providing a request to write content to a GVM address (e.g., a GVM address corresponding to a particular page), as depicted at 204. Responsive to the request 204, the guest operating system 120, as depicted at 208, maps the GVM address to a GPM address and provides a corresponding request to write to the GPM address, as depicted at 212.

The snapshot engine 180 may respond to the write request 212 as follows. First, as depicted at block 224, the snapshot engine 180 searches the versioned SRT 174 for an SRT entry that corresponds to the next snapshot. Next, as depicted at decision block 228, the snapshot engine 180 determines whether an SRT entry was found in the search. In an example, an SRT entry for the next snapshot may not exist in the versioned SRT 174 if the current write request is the first write request to the GPM address after the last snapshot. If an SRT entry does not exist, then, pursuant to block 232, the snapshot engine 180 allocates an RPM address for the next snapshot. In this manner, in accordance with example implementations, each snapshot for a particular GPM address may have a different RPM address, which allows the snapshot to be retrieved from RPM. Moreover, as also depicted in FIG. 2, in accordance with example implementations, block 232 may also include the snapshot engine 180 allocating a block address in the stable storage 182 for the snapshot so that each snapshot has a different block address in the stable storage 182. The hypervisor 150 may further map the GPM address to the newly-allocated RPM address. Pursuant to block 236, the snapshot engine 180 creates, or adds, an SRT entry to the versioned SRT 174 for the next snapshot. In accordance with example implementations, the added SRT entry may indicate that the snapshot is mutable, and therefore is not finalized (i.e., the snapshot may further change, depending on the snapshot generation policy and whether other write(s) to the GPM address occur before the taking of the snapshot).

The snapshot engine 180 may then update the snapshot under construction at the RPM address, pursuant to block 240. In accordance with example implementations, for the first write to a GPM address after the generation of a previous snapshot for the GPM address, block 240 may involve the snapshot engine 180 first copying the content at the RPM address associated with the previous snapshot to the RPM address associated with the next snapshot and then updating the content at the latter RPM address in accordance with the write request 212. For subsequent writes to the GPM address, block 240 may involve the snapshot engine 180 updating the content at the RPM address of the snapshot under construction.

Pursuant to decision block 244, the snapshot engine 180 may next determine whether to take, or generate, a snapshot. This decision may be based on a particular snapshot generation policy. In an example, the snapshot generation policy may be to always generate a snapshot for each write, and accordingly, the snapshot engine 180 may proceed with actions 248 and 252 associated with generating the snapshot. In another example, the snapshot generation policy may allow multiple writes to a GPM page before a policy-defined trigger occurs to prompt the snapshot engine 180 to generate the snapshot. In such implementations, decision block 244 may trigger the generation of multiple snapshots (e.g., mark all SRT entries corresponding to a particular snapshot version number as being immutable and write the corresponding snapshots to the stable storage 182). If, pursuant to decision block 244, the snapshot engine 180 determines not to generate the snapshot(s), then the process 200 terminates. Otherwise, if, pursuant to block 244, the snapshot engine 180 determines that the snapshot(s) are to be generated, then the snapshot engine 180 writes (block 248) the snapshot(s) to stable storage 182 and modifies the SRT entry to mark the snapshot as being immutable.

In accordance with further implementations, the snapshot engine 180 may evaluate the snapshot generation policy, determine whether to generate the next round of snapshots and trigger the generation of the next round of snapshots (e.g., perform blocks 244, 248 and 252) independently from responding to a write requests. For example, a particular snapshot generation policy may define snapshot generation triggers pursuant to a schedule, and the snapshot generation engine 180 (or another entity) may be triggered (e.g., triggered via clock-initiated interrupts) to finalize snapshots under construction and write the finalized snapshots to RPM and stable storage according to the schedule. In accordance with further implementation, the snapshot generation policy may define snapshot generation triggers based on other criteria (e.g., triggers initiated in response to certain system events, triggers initiated by programs 130, triggers initiated by users, triggers initiated by a system administrator, or other triggers).

Figure 3:
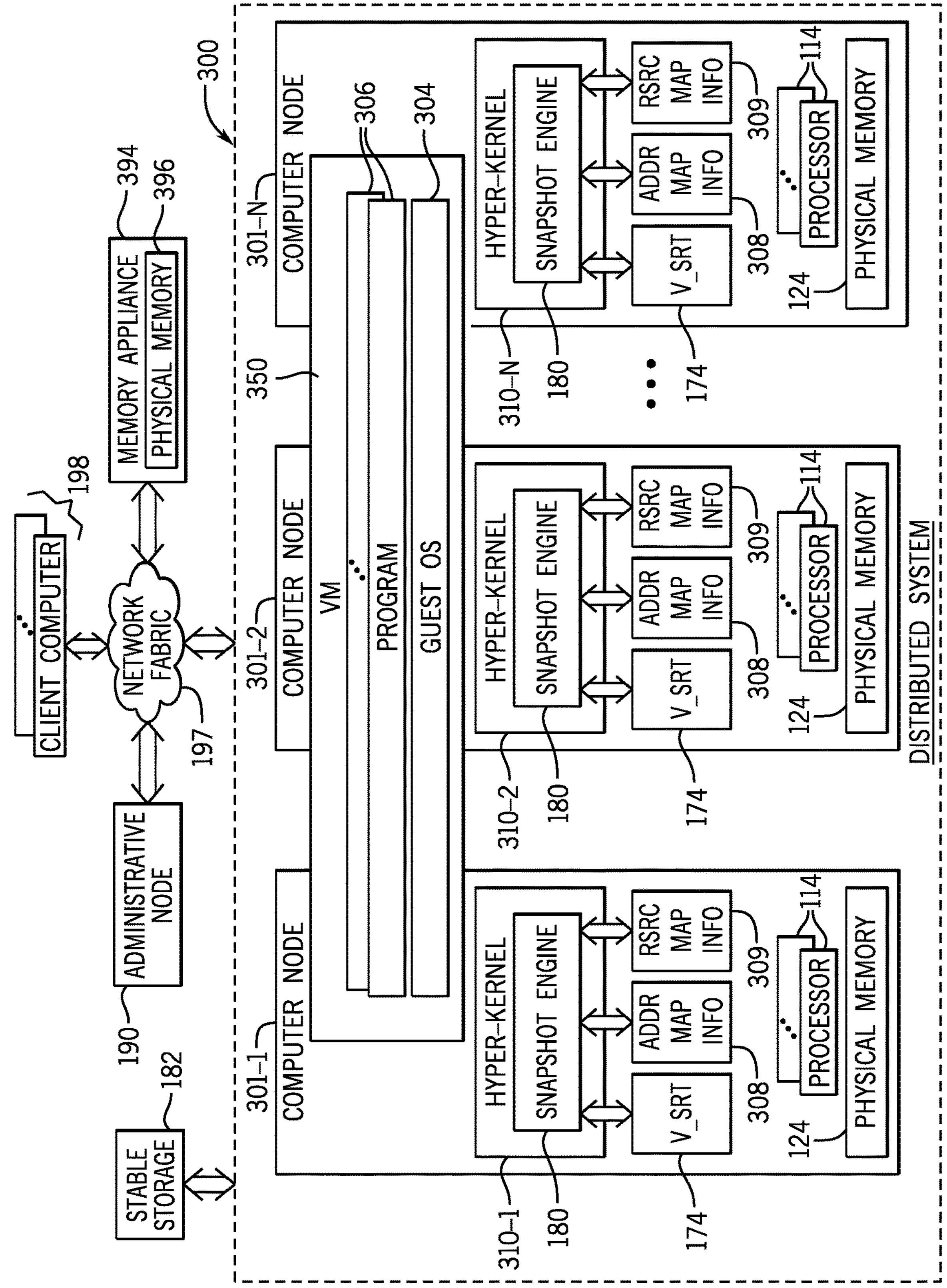

FIG. 3 is a block diagram of a virtualized distributed system 300 in accordance with a further example implementation. The virtualized distributed system 300 may be referred to as a "software-defined server," or "SDS." The virtualized distributed system 300 may be part of a computer network similar to the one depicted in FIG. 1, with the same reference numerals being used to identify similar components. Unlike the computer network depicted in FIG. 1, the computer network of FIG. 3 includes a memory appliance 394 that contains memory devices that correspond to at least part of the RPM space for the virtualized distributed system 300.

The virtualized distributed system 300 includes a VM 350 that can run across N multiple computer nodes 301 (computer nodes 301-1, 301-2 and 301-N, being depicted in FIG. 3). Stated differently, the N computer nodes 301 host the VM 350. Although FIG. 3 depicts one VM 350, in accordance with further implementations, there can be at least one other VM that can run across multiple computer nodes 301-1 to 301-N. The computer nodes 301-1 to 301-N collectively form one VM 350 that hosts a guest operating system 304 and a collection of programs 306 that run in the VM 350. Examples of operating systems include any or some combination of the following: a Linux operating system, a Microsoft WINDOWS operating system, a Mac operating system, a FreeBSD operating system, and so forth.

Address mapping information 308 is maintained for the VM 350, which maps guest virtual memory addresses of a guest physical memory address space that refers to locations of a host virtual memory to physical addresses of a hyper-kernel physical address space. The hyper-kernel physical address space is a physical address space provided by a hyper-kernel. From the point of view of the guest operating system 304, the guest physical memory is treated as a physical memory. However, the guest physical memory is actually virtual memory that is provided by hyper-kernels (or "hyper-kernel instances") 310-1, 310-2 . . . 310-N running in respective computer nodes 301-1, 301-2 to 301-N.

A hyper-kernel 310 (or "hyper-kernel instance") on each physical computer node 301 functions as part of a distributed hypervisor. The hyper-kernels 310 communicate with each other to collectively perform tasks of a hypervisor. The hyper-kernel 310 may be considered an example of a kernel that manages and uses a versioned SRT 174. Each hyper-kernel 310 can observe the distributed system 300 running in real time and optimize system resources of the respective computer nodes 301 to match the requirements of the distributed system 300 during operation. The hyper-kernels 310 unify the hardware resources of the computer nodes 301 and present the unified set to the guest operating system 304.

In accordance with example implementations, the hardware resources of each computer node 301 include a collection of physical processors 114, physical memory 124, as well as other physical hardware resources. The computer node 301 may include various other physical resources, such as network interfaces, I/O resources, as well as physical resources belonging to other categories.

The abstraction of physical resources provided by the hyper-kernels 310 unify the hardware resources of the computer nodes 301 to present a unified set of hardware resources (i.e., a unified view) to the guest operating system 304 Accordingly, the guest operating system 304 has the view of a single large computer, containing an aggregated set of processors, memories, I/O resources, network communication resources, and so forth.

The guest operating system 304 in the VM 350 is presented with virtual processors (also referred to as virtual central processing units or vCPUs) that are virtualized representations of the physical processors 314 of the computer nodes 301, as presented by the distributed hypervisor made up of the hyper-kernels 310. As an example, if there are five computer nodes 301 and each computer node 301 has 100 physical processors, then the distributed hypervisor presents the guest operating system 304 with 500 virtual processors. In actuality, there are five physical computer nodes 301 that each have 100 physical processors.

In additional to having second level mapping information 308 available to map GPM addressees to RPM address, the hyper-kernels 310 also have resource mapping 309 available. The resource mapping 309 includes a physical resource map that describes the physical resources that are available on each computer node 310, an initial resource map that describes the virtual resources that are available from the point of view of the guest OS 304, and a current resource map that describes, from the point of view of each computer node 310, the current mapping between the virtual resource map and the physical resource map.

In accordance with example implementations, the distributed hyper-kernel may include a distributed snapshot engine that is formed from local snapshot engines 180 associated with respective computer nodes 301. In accordance with further example implementations, the snapshot engine 180 may be external to the hyper-kernels 310. A versioned SRT may also be distributed among the computer nodes 301, such that each computer node 301 has an associated versioned SRT subpart 374.

The snapshot engine 180 may use and maintain the SRT entries of its versioned SRT subpart 374. The snapshot engine 180 may, in accordance with example implementations, handle updating the local versioned SRT subpart 374 for I/O writes that are affiliated with RPM addresses of the computer node 301. Stated differently, in accordance with example implementations, the snapshot engine 380 of a particular computer node 301 handles SRT updates for I/O writes affiliated with GPM addresses that are backed by RPM located on the computer node 301.

In accordance with example implementations, the memory appliance 394 may include an array of persistent memory and a processor that is configured to implement a cache coherency protocol. In accordance with some implementations, the persistent memory of the memory appliance is centrally located and is accessible to all of the computer nodes 310. In accordance with further implementations, the memory appliance 394 may be distributed in parts throughout the distributed system 300 on one or multiple computer node 310. RPM 396 may be placed on the memory appliance 394, just as RPM may be placed on the computer nodes 301.

FIG. 4 depicts an example versioned SRT 174, in accordance with some implementations. Referring to FIG. 4, the versioned SRT 174 includes a column 404 of stable storage block addresses, a column 406 of RPM addresses, a column 408 of GPM addresses and a column 410 of snapshot version numbers. The versioned SRT 174 has P SRT entries 404 corresponding to P rows of the SRT 174. Specific SRT entries 404-1, 404-2, 404-3, 404-M and 404-P are depicted in FIG. 4. Although a table data structure is described herein for illustrative purposes, the techniques described herein may be variously adapted to accommodate other types of storage replica data structures.

Example SRT entry 404-2 includes data representing a storage block address of "[12, 0x1456]." Here, the suffix "0x" denotes a hexadecimal representation, and the storage block address represented disk number 12 and a logical block address of 1456 on that disk. The SRT entry 404-2 also includes data representing an RPM address of "[2, 0x987654]," which is a 4K page number 987654 in the RPM address space on a computer node having a node ID of "2." The SRT entry 404-2 further includes data representing a GPM address of "0x675432" which is a 4K page number 67432. In accordance with further implementation, the node number may be omitted if the physical address is interpreted locally on the node, and the node number is therefore implied. The SRT entry 404-2 further includes data representing a snapshot version number of "7."

The example SRT entries 404-1, 404-2, 404-3 and 404-P correspond to generated snapshots having snapshot version numbers 4, 7, 7 and 3 respectively. Because the SRT entries 404-1, 404-2, 404-3 and 404-P correspond to taken, or generated, snapshots, these entries correspond to immutable snapshots. As depicted in FIG. 4, in accordance with some implementations, the versioned SRT 174 may include a status column 412 that contains data that represents whether the SRT entry 404 corresponds to a snapshot that is immutable (represented by an "I") and therefore corresponds to a finalized snapshot, or whether the SRT entry 404 corresponds to a snapshot that is mutable (represented by an "M"), or under construction. Accordingly, for the example versioned SRT 174 of FIG. 45, the SRT entries 404-1, 404-2, 404-3 and 404-P correspond to snapshots that are immutable (as represented by an "I" in a status column 412 of the SRT 174 of FIG. 4).

The example SRT entry 404-M has a status 412 that indicates that the SRT entry 404-M is associated with a snapshot under construction, i.e., the snapshot is mutable. More specifically, for the example implementation of FIG. 4, both SRT entries 404-2 and 404-M are associated with the GPM address 0x675432. The SRT entry 404-3 corresponds to a previously-taken (and finalized) snapshot having a snapshot version number of "7." The SRT entry 404-M corresponds to a snapshot being constructed and corresponds to snapshot version number "8." When snapshot version number 8 is taken, or finalized, for the GPM address 0x675432, the snapshot generation engine may then update the status 412 to indicate that the corresponding snapshot is now immutable.

In accordance with example implementations, an SRT may be used by a kernel (e.g., a hypervisor or a hyper-kernel of a distributed system) to quickly restore RPM content of a computer node during a boot of the computer node after a software crash. For this purpose, the kernel may use the information contained in a an SRT to identify RPM-based clones of stable storage blocks for purposes of retrieving the snapshots from RPM and avoid retrieving the snapshots from stable storage using costly I/O operations. With the versioning information added to the SRT to create a versioned SRT, as described herein, the information contained in the versioned SRT allows additional efficient operations beyond those related to booting a computer node. As examples, in accordance with some implementations, a versioned SRT may be used for purposes of performing in-memory retrieval of snapshots for a wide variety of purposes.

As an example, rolling back memory content to prior version snapshots and using in-memory transfers for this purpose allows relatively fast data restoration after an unintended modification or deletion of in-memory data. The unintended modification or deletion may occur due to any of a number of reasons, such as a modification or deletion made by an authorized user, an unauthorized modification or deletion made by an unauthorized user, a modification or deletion made by a rogue agent (e.g., malware), data corruption.

Figure 5:
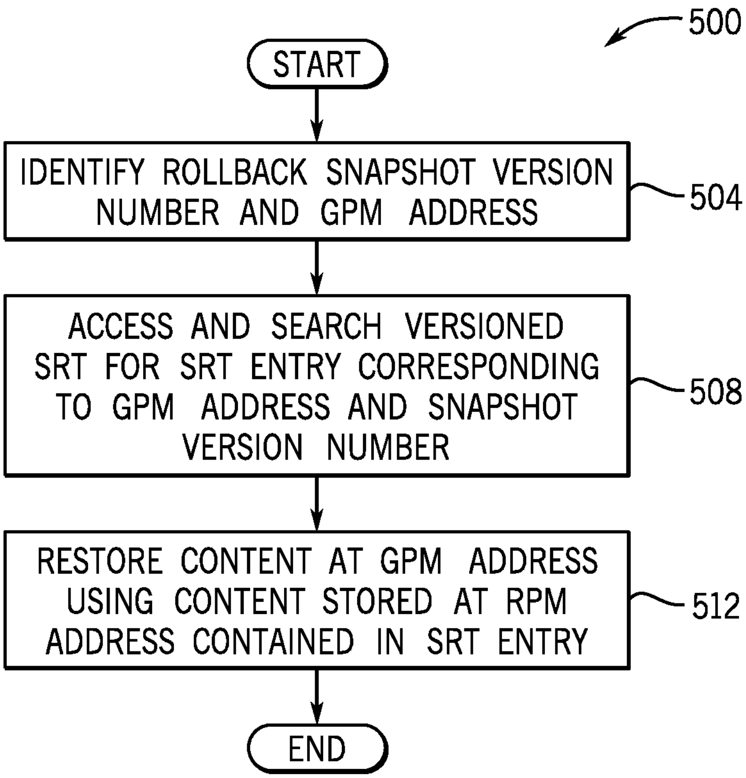
FIG. 5 is a flow diagram depicting a process that uses a versioned SRT to roll back content stored at a guest physical memory address according to an example implementation.

FIG. 5 depicts a process 500 for restoring in-memory content according to a previous snapshot version number, in accordance with example implementations. In an example, the process 500 may be performed by a kernel of a distributed system and may be performed by a snapshot engine of the kernel. In another example, the process 500 may be performed by another entity of a virtualized distributed system. Although FIG. 5 depicts a particular example of restoring a particular snapshot, in accordance with example implementations, the process 500 may be extended to restore multiple snapshots corresponding to a particular snapshot version number, in accordance with further example implementations.

Referring to FIG. 5, in accordance with example implementations, the process 500 includes identifying (block 504) a rollback snapshot version number and a GPM address. Pursuant to block 508, the process 500 includes accessing and searching a versioned SAT for an SAT entry that corresponds to the GPM address and corresponds to the snapshot version number. In this context, an SRT entry "corresponding to the snapshot version number" refers to the SRT entry containing a snapshot version number that is equal to or less than the identified snapshot version number and is the most recent snapshot version number for the GPM address. In an example, the identified snapshot version number may be "7," and the versioned SRT may contain an SRT entry associated with snapshot version 7, which is the SRT entry that corresponds to the identified snapshot version number. In another example, the identified snapshot version number may be "7," and the most recent snapshot for the GPM address may be snapshot number 4. For this example, the SRT entry containing snapshot version number 4 is the SRT entry that corresponds to the identified snapshot version number 7.

The process 500 includes, pursuant to block 512, restoring the content at the GPM address using the content (e.g., a page or block) that is stored at the RPM address that is contained in the SRT entry. In an example, in accordance with some implementations, restoring the content may include an in-memory data transfer (e.g., a read and then a write) from the RPM address contained in the SRT entry to the current RPM address that is mapped to the GPM address.

As another example of a potential use of the versioned SRT, a kernel of a distributed system may use a versioned SRT in connection with mirroring operations. Mirroring may be used for a number of different applications. In an example, mirroring may be used in a high availability (HA) system that includes features (e.g., redundant software and hardware) that avoid single points-of-failure so that the HA system remains available even if failures occur. An HA system may include a primary server and a secondary server that is paired with the primary server. In a specific example, the primary and secondary servers may be respective SDSs. The mirroring may involve, for example, copying data to the secondary server so that should the primary server fail, the secondary server can takeover for the primary server and quickly recover the operation of the running system. In another example, the mirroring may be used in conjunction with a disaster recovery (DR) system. For example, an HA server pair may be located in respective geographic regions that are sufficiently isolated such that an event in one region, which causes an outage affecting one server would not be expected to cause an outage that affects the other server. In another example, data may be mirrored between HA servers that are located in the same availability zone (e.g., located in the same data center). In another example, mirroring may be used for purposes of storing a copy of a system state in backup storage. In another example, the mirroring may not involve HA servers.

Figure 6:
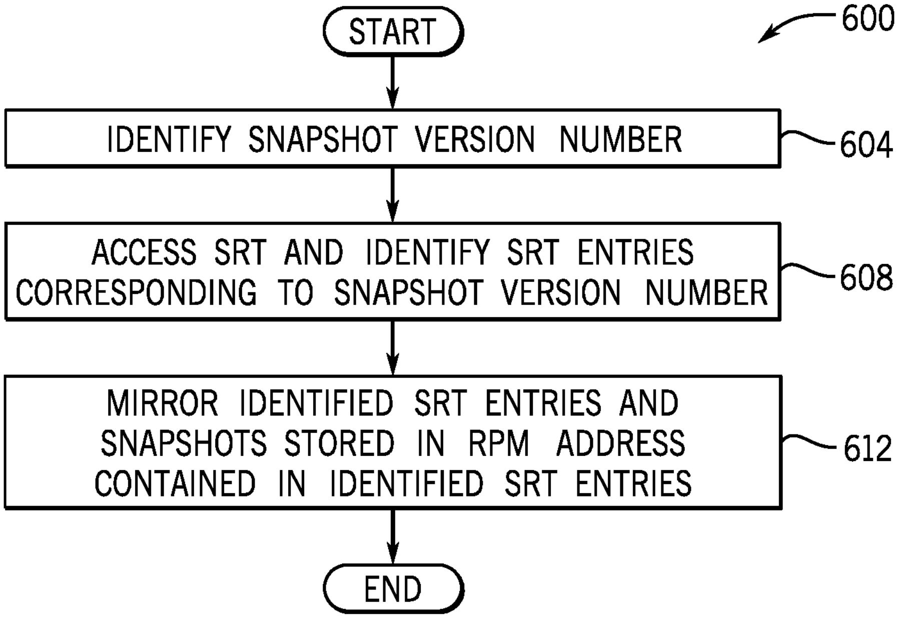
FIG. 6 is a flow diagram depicting a process that uses a versioned SRT to performing mirroring according to an example implementation.

Regardless of the particular type or purpose of the mirroring, a mirroring process 600 that is depicted in FIG. 6 may be used, in accordance with example implementations. As an example, the process 600 may be performed by a kernel of a virtualized distributed system and may be performed by a snapshot engine of the kernel. In another example, the process 600 may be performed by an entity other than a kernel of the virtualized distributed system.

Referring to FIG. 6, in accordance with example implementations, the process 600 includes identifying (block 604) a snapshot version number that is associated with the mirroring. As an example, the snapshot version number may correspond to the latest in-memory snapshots. Pursuant to block 608, the process 600 includes accessing a versioned SRT and identifying SRT entries that correspond to the snapshot version number. Pursuant to block 612, the process 600 includes mirroring the identified SRT entries and snapshots. Moreover, also pursuant to block 612, the process 600 includes mirroring the snapshots that correspond to the identified snapshot version number and are stored in the RPM addresses that are contained in the identified SRT entries. Depending on the particular implementation, the mirroring may involve writing the mirrored snapshots and SRT entries to a local stable storage or may involve writing the mirrored SRT entries and snapshots to remote storage (e.g., writing the mirrored data over a wide area network (WAN) to a remote storage, such as a storage associated with a DR system).

Figure 7:
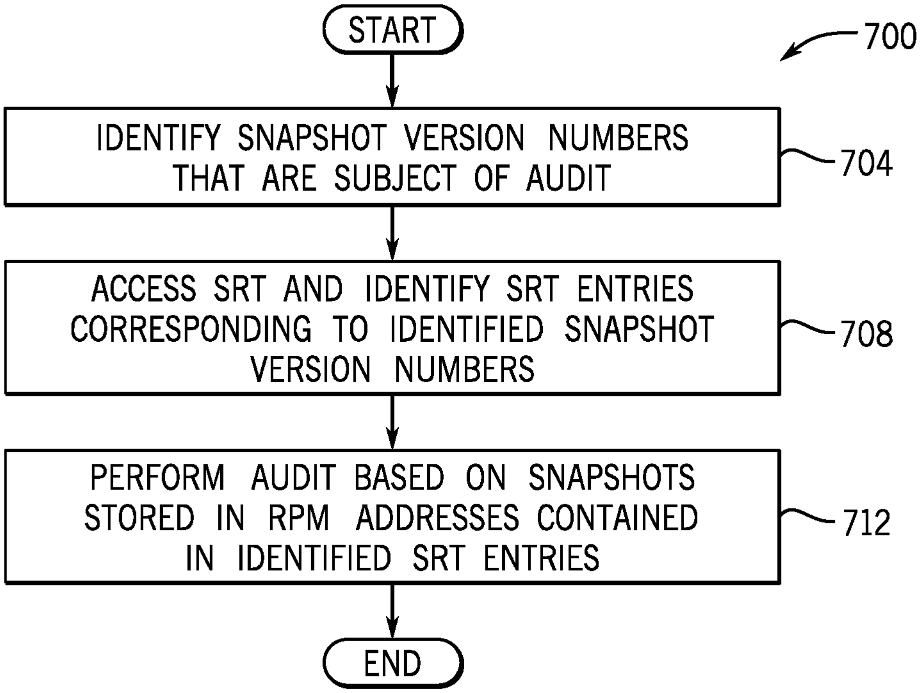
FIG. 7 is a flow diagram depicting a process that uses a versioned SRT to perform an audit according to an example implementation.

As another example of a use of a versioned SRT, in accordance with example implementations, a versioned SRT may be used for purposes of performing an audit of in-memory changes. FIG. 7 depicts an example process 700 that may be used in connection with an audit, in accordance with some implementations. In an example, the process 700 may be performed by a kernel of a virtualized distributed system. In an example, the process 700 may be performed by a snapshot engine of the kernel. In another example, the process 700 may be performed by an entity other than a kernel of a virtualized distributed system.

Referring to FIG. 7, in accordance with some implementations, the process 700 includes identifying (block 704) snapshot version numbers that are the subject of the audit. In an example, the audit may analyze changes between two snapshots, and as such, the identified snapshot version numbers may correspond to the snapshots being analyzed. In another example, block 704 may include providing a snapshot version number corresponding to a baseline snapshot version number. Moreover, block 704 may include providing additional snapshot version numbers associated with later snapshots than the baseline snapshots. Continuing the example, the audit may, for example, evaluate the snapshots corresponding to each subsequent snapshot version number corresponding to the baseline snapshots.

Pursuant to block 708, the process 700 includes accessing the versioned SRT and identifying SRT entries corresponding to the identified snapshot version numbers. Pursuant to block 712, the audit may then be performed based on snapshots that are stored in the RPM addresses, which are contained in the identified SRT entries.

In accordance with further implementations, the versioned SRT may be used for purposes of performing an audit on the SRT entries of a versioned SRT. In this manner, the audit may, for example, evaluate the movement of in-memory data between RPM addresses and/or block addresses of stable storage.

In accordance with example implementations, the audit may be used in conjunction with a security threat analysis. In an example, in-memory changes associated with an application or program may be analyzed to evaluate the behavior of an application for purposes of recognizing behavior corresponding to malevolent behavior. In another example, in-memory changes may be evaluated for purposes of detecting any change, which would be indicative of malevolent behavior, such as, for example, changes related to a protected OS kernel data structure or a protected or sensitive register space.

Figure 8:
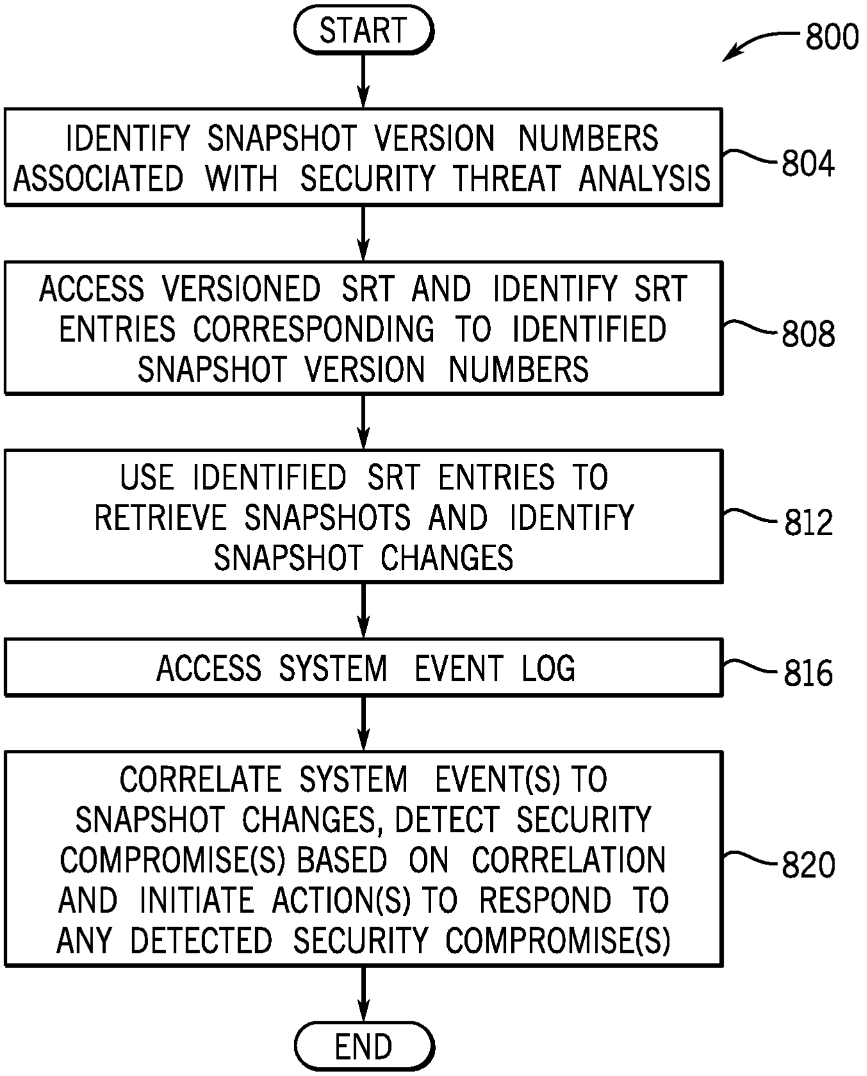
FIG. 8 is a flow diagram depicting a process that uses a versioned SRT to detect a security attack according to an example implementation.

In accordance with example implementations, a versioned SRT may be used to correlate in-memory changes to system events. In an example, the evaluation of in-memory changes and correlation to system events may be part of a threat analysis. FIG. 8 depicts an example process 800 that may be used for purposes of detecting and responding to a security threat based on detected in-memory changes and system events. The process 800 may be performed by any of a number of entities, such as, for example, a security analysis system of a distributed system. As an example, the security analysis engine may be part of a kernel of the distributed system. As another example, the security threat analysis engine may be part of a management system (e.g., a baseboard management controller or kernel agent) of the distributed system.

Referring to FIG. 8, in accordance with some implementations, the process 800 includes identifying (block 804) snapshot version numbers that are associated with a security threat analysis. In an example, the identified snapshot version numbers may be the two most recent snapshot version numbers. Pursuant to block 808, the process 800 includes accessing a versioned SRT and identifying the SRT entries that correspond to the identified snapshot version numbers. The identified SRT entries may then be used to retrieve corresponding snapshots and identify snapshot changes, pursuant to block 812. In this manner, the identified SRT entries identify respective RPM addresses, and the snapshots are read from the RPM addresses and compared for purposes of determining the changes.

The process 800 further includes, pursuant to block 816, accessing a system event log. The system event log may include timestamp entries of any of a number of different events that occur with a particular computer node of the distributed system. As examples, the system events may include privilege escalations, application faults, hardware faults, domain name service (DNS) resolution failures, login attempt failures, or any of a number of different events that may be indicative of potential malevolent activity in the virtualized distributed system. Pursuant to block 820, the process 800 includes correlating one or multiple system event(s) to the changes. In this manner, in accordance with some implementations, the virtualized distributed system may maintain a log of timestamp entries associated with times that the snapshots were taken, such that a particular change that occurs with a particular snapshot at time A may be matched up with a particular system event that coincides with time A. Accordingly, the correlation allows system events to be causally connected to in-memory changes. Such causal connections, in turn, may indicate, or represent, a corresponding security attack. As depicted in block 820, the process 800 may include initiating one or multiple actions to respond to any detected security compromise. As examples, the actions may include alerting a system administrator, quarantining a computer node, quiescing operations of a computer node from a remainder of the virtualized distributed system, quiescing a computer node from a cloud system, quiescing the distributed system from other systems, powering down a particular computer node, resetting a particular computer node, or one or multiple other actions.

Figure 9:
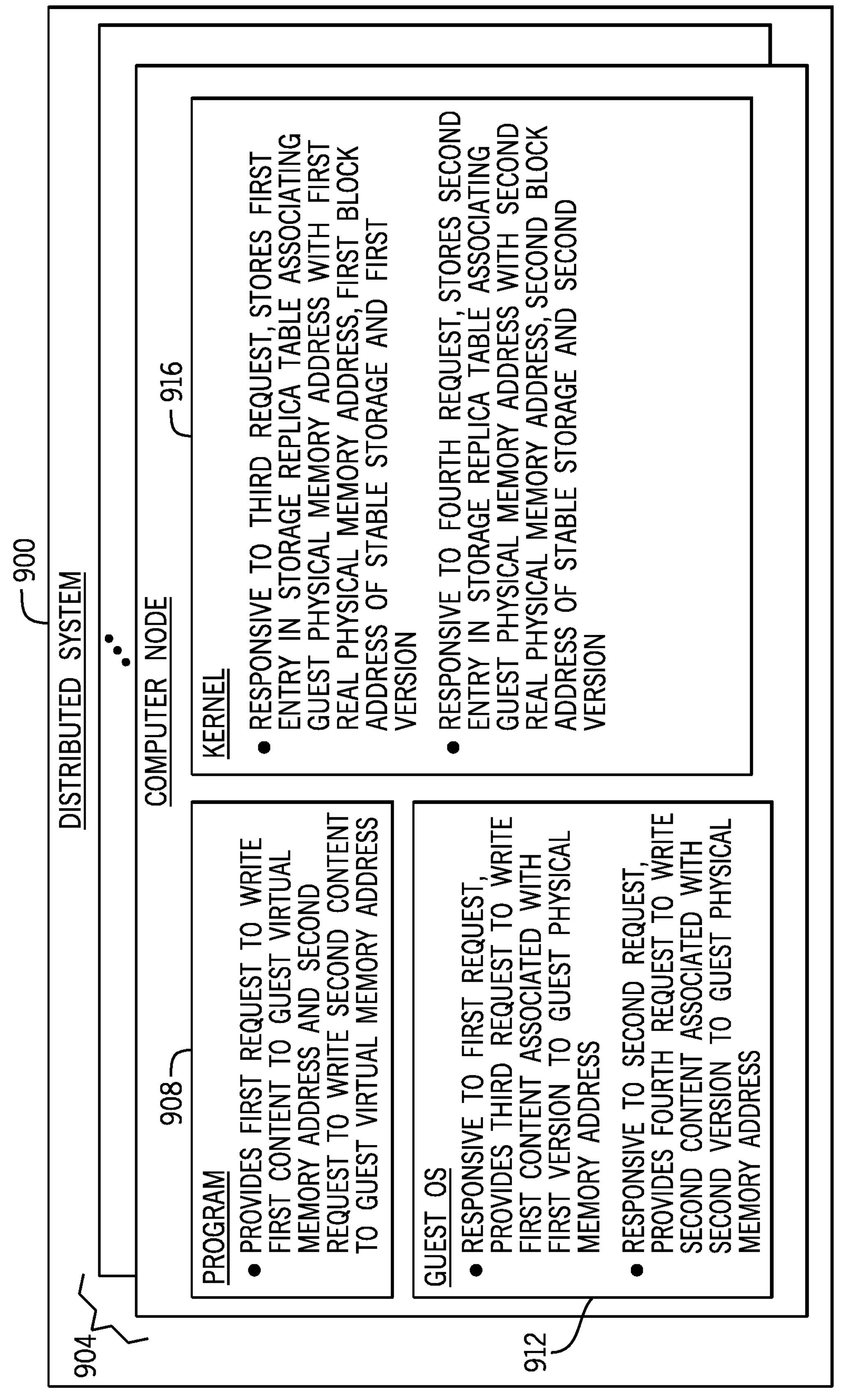
FIG. 9 is a block diagram of a distributed system that has a versioned SRT according to an example implementation.

Referring to FIG. 9, in accordance with example implementations, a distributed system 900 includes a plurality of computer nodes 904. In an example, the distributed system 900 may be a virtualized distributed system, which includes one or multiple virtual machines that are hosted by the computer nodes 904. In an example, each virtual machine may have an associated guest operating system, and one or multiple virtual machines may run on each computer node of the system. In another example, the distributed system 900 may be a software-defined server in which a single virtual machine runs across the computer nodes 904.

The computer node 904 includes a program 908, a guest operating system 912 and a kernel 916. In an example, the guest operating system 912 may be located on a particular computer node 904. In another example, the guest operating system 912 may be distributed across multiple computer nodes 904. In an example, the kernel 916 may be a hypervisor. In another example, the kernel 916 may be a hyperkernel that is distributed across the computer nodes 904.

The program 904 provides a first request to write a first content to a guest virtual memory address and a second request to write a second content to the virtual memory address. In an example, the distributed system 900 may contain memories that may be categorized according to three types: a guest virtual memory, which corresponds to a guest virtual memory address space; a guest physical memory, which corresponds to a guest physical memory address space; and a real physical memory, which corresponds to a real physical memory address space. The guest virtual memory is the memory that is seen by applications that run a guest operating system due to a guest virtual memory abstraction that is provided by the guest operating system. For purposes of providing the guest virtual memory abstraction, the guest operating system maps guest virtual memory addresses to guest physical memory addresses. The real physical memory may correspond to the actual physical memory devices of the distributed system 900.

The guest operating system 912, responsive to the first request, provides a third request to write the first content that is associated with a first to a guest physical memory address. The kernel, responsive to the second request, provides a fourth request to write the second content associated with a second version to the guest physical memory address. In an example, the first entry may associate the guest physical memory page with a particular snapshot version number. In an example, the first entry may associate the guest physical memory page with a real physical memory address for which content associated with the snapshot version number is stored. In accordance with example implementations, the first entry may associate the guest physical memory address with a block address of stable storage at which the snapshot corresponding to the snapshot version number is stored in stable storage.

The kernel 916, responsive to the third request, stores a first entry in a storage replica table. The first entry associates the guest physical memory address with a first real physical memory address, a first block address of stable storage and the first version. In an example, the second entry may be associated with a particular snapshot version number, and a snapshot corresponding to the snapshot version number may be stored with the block address and real physical memory address identified by the second entry. The kernel 916, responsive to the fourth request, stores a second entry in the storage replica table associating the guest physical memory address with a second real physical memory address, a second block address of stable storage and the second version.

Figure 10:
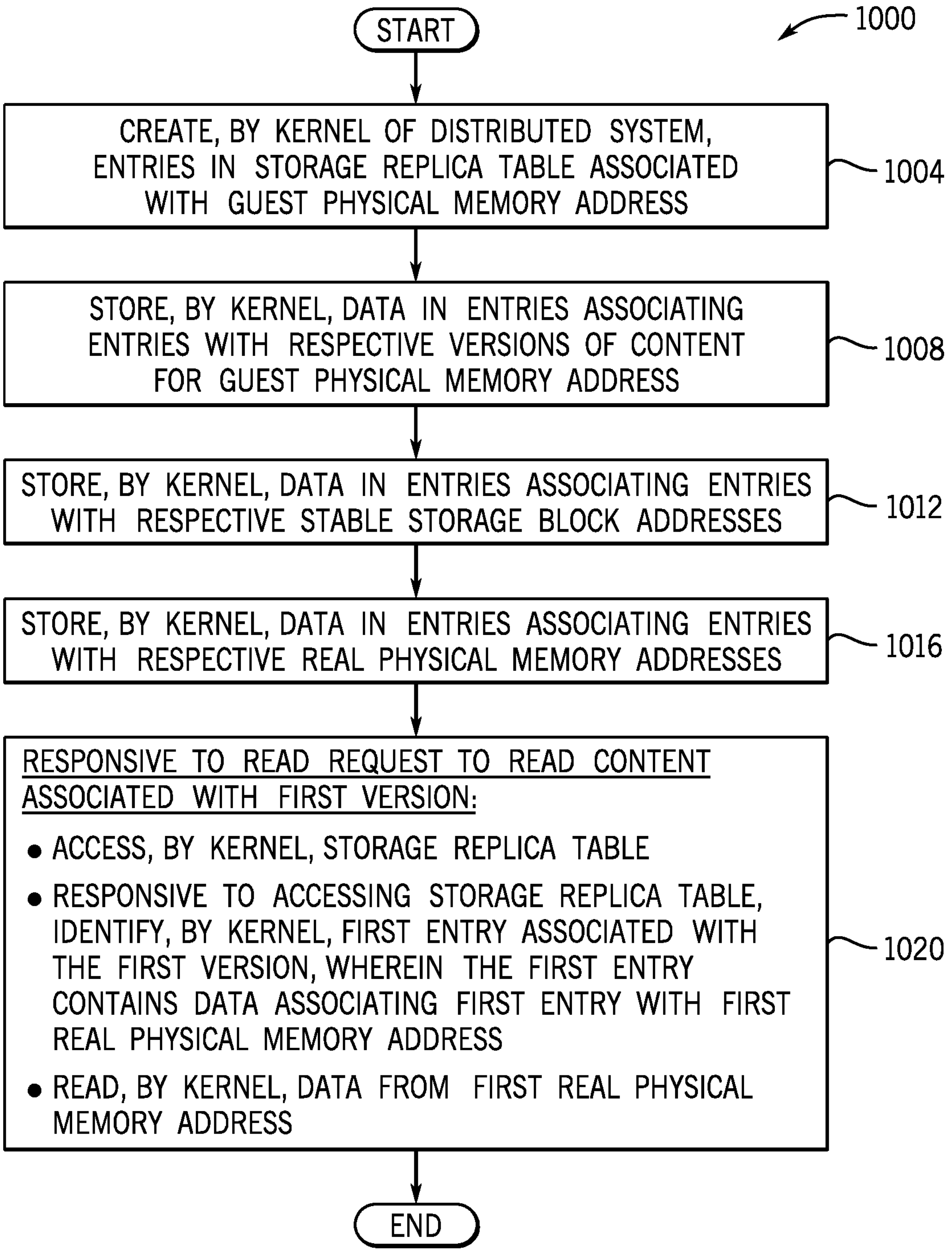
FIG. 10 is a flow diagram depicting a process to update a versioned SRT according to an example implementation.

Referring to FIG. 10, in accordance with example implementations, a process 1000 includes creating (block 1004), by a kernel of a distributed system, entries in a storage replica table; and storing (block 1008), by the kernel, data in the entries associating the entries with respective versions of content for the guest physical memory address. The entries are associated with a guest physical memory address. In an example, the distributed system may include multiple virtual machines, where each machine may be run on a particular computer node of the distributed system. In another example, the distributed system may be a software-defined server in which a single virtual machine is hosted on multiple computer nodes of the distributed system.

In an example, the kernel may be a distributed hyper-kernel of a software-defined server. In another example, the kernel may be a hypervisor. In an example, the hypervisor may be located on a particular node of the distributed system. In an example, the kernel may be part of an intermediate virtualization layer of the distributed system.

The given guest physical memory address may correspond to a guest physical memory space of the distributed system. In an example, the distributed system may also include a real physical memory space and a guest virtual memory space. The guest virtual memory space refers to a memory space that is seen by applications, or programs, that run on a guest operating system due to a guest virtual memory abstraction that is provided by the guest operating system. For purposes of providing the guest virtual memory abstraction, the guest operating system may map guest virtual memory addresses to guest physical memory addresses. The guest operating system may view the guest physical memory as being actual, or real, physical memory. However, the guest physical memory may be virtual. Although the guest physical memory address space appears to the guest operating system to be linear, in accordance with example implementations, this is an illusion.

In an example, the storage replica table may be a versioned storage replica table that contains multiple entries for a given guest physical memory address. The multiple entries may, for example, correspond to different snapshots of the guest physical memory address. The entries of the storage replica table associate the guest physical memory addresses with stable storage block addresses. The entries of the storage replica table associate the guest physical memory addresses with versions (e.g., snapshot version numbers). Entries associate the guest physical memory addresses with real physical memory addresses. The guest physical memory addresses of the storage replica table include the given guest physical memory address associated with the request, and the versions of the storage replica table include the given version that corresponds to the request.

The process 1000 includes, storing (block 1008), by the kernel, data in the entries associating the entries with respective stable storage block addresses; storing (block 1012) data in the entries associating the entries with stable storage block addresses; and storing (block 1016), by the kernel, data in the entries that associate the entries with respective real physical memory addresses. In an example, multiple snapshots may correspond to the content of the guest physical memory address at different times (and corresponding to different corresponding version numbers), and multiple entries of the storage replica table may store the in-memory and block storage addresses for these snapshots.

The process 1000 includes, pursuant to block 1020, performing a set of operations in response to a read request to read content that is associated with a first version. In an example, the content that is associated with a first version may be a snapshot of the content of the guest physical memory address taken at a previous time. In an example, the guest physical memory address may have one or multiple other associated snapshots with versions that are more recent than the first version. In an example, the guest physical memory address may have one or multiple other associated snapshots with versions that are less recent than the first version.

In response to the read request, the process 1000 includes, pursuant to block 1020, accessing the storage replica table. In an example, accessing the storage replica table may include the kernel reading data from a data structure in memory, which contains records that correspond to multiple tuple entries of the storage replica table. Also, in response to the request, the process 1000 includes, pursuant to block 1020, responsive to accessing the storage replica table, identifying, by the kernel, a first entry of the entries associated with the first version. The first entry contains data that associates the first entry with a first real physical memory address. In an example, identifying the first entry may include the kernel reading the entries of the storage replica table until the kernel identifies an entry that contains data identifying the guest physical memory address and data identifying the first version. In this reading of the entries, the kernel may read one or multiple other entries that include data that identify the guest physical memory address but correspond to versions other than the first version. The first entry may or may not be mutable, and in an example, the first entry may have data that represents whether or not the first entry is mutable. Also pursuant to block 1020, the process 1000 includes the kernel reading data from the first real physical memory address. In an example, the read content corresponds to the snapshot associated with the first version.

Figure 11:
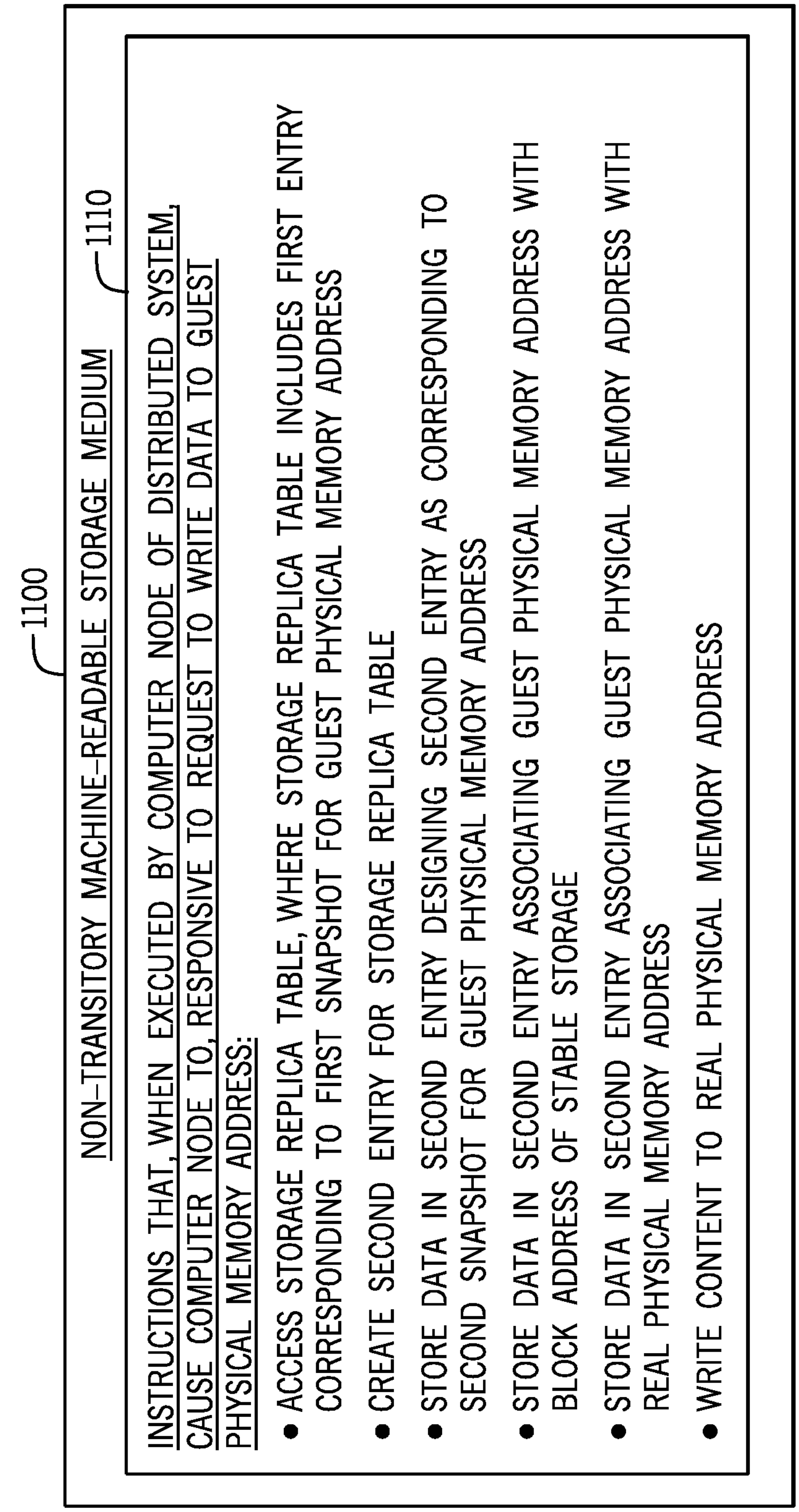
FIG. 11 is an illustration of machine-readable instructions that are stored on a non-transitory machine-readable storage medium to cause a computer node of a distributed system to use a versioned SRT to respond to a write to a guest physical memory address according to an example implementation.

Referring to FIG. 11, in accordance with example implementations, a non-transitory machine-readable storage medium 1100 includes instructions 1110. The instructions 1110, when executed by a computer node of a distributed system, cause the computer node to, responsive to a request to write data to a guest physical memory address, access a storage replica table. In an example, the instructions may be executed by a kernel of the distributed system. In an example, the kernel may be a hypervisor. In an example, the hypervisor may be located on a particular computer node of the distributed system. In an example, the kernel may be a hyper-kernel that is distributed across computer nodes of the distributed system.

In an example, the distributed system may include multiple virtual machines, in which each virtual machine is hosted by a particular node of the distributed system. In an example, the distributed system may be a software-defined server that contains a single virtual machine that is distributed across the computer nodes of the distributed system. In an example, the kernel may be part of an intermediate virtualization layer of the distributed system. In an example, accessing the storage replica table may include reading one or multiple entries of the storage replica table.

The storage replica table may be a versioned storage replica table. In an example, the storage replica table may be used to identify in-memory clones of stable storage blocks and may be used by the kernel in a boot of a particular computer node of the distributed system for purposes of rapidly starting up the computer node. In an example, the versioned storage replica table may contain entries correspond to different snapshots of content of the same guest physical memory address. In an example, these entries may contain version numbers that identify the respective snapshot version number for the guest physical memory address.

The instructions 1110, when executed by the computer node, cause the computer node to, responsive to the request to write content to the guest physical memory address, access a storage replica table. The storage replica table includes a first entry that corresponds to a first snapshot for the guest physical memory address. In an example, the guest physical address may be part of a guest physical address space of the distributed system, and the distributed system may further include a guest virtual memory space and a real physical memory space. The guest virtual memory space is the memory that is seen by programs that run a guest operating system due to a guest virtual memory abstraction that is provided by the guest operating system. For purposes of providing the guest virtual memory abstraction, the guest operating system maps guest virtual machine addresses to guest physical memory addresses. The real physical memory space corresponds to actual, or real, physical memory provided by actual physical memory devices of the distributed system.

The instructions 1110, responsive to the request to write content to the guest physical memory address, creates a second entry for the storage replica table; and stores data in the second entry that designates the second entry as corresponding to a second snapshot for the guest physical memory address. The instructions 1110, responsive to the request to write content to the guest physical memory address, also stores data in the second entry associating the guest physical memory address with a block of stable storage and stores data in the second entry associating the guest physical memory address with a real physical memory address. In an example, the stable storage is a persistent storage that allows atomic writes.

The instructions 1110, when executed by the computer node, further cause the computer node to, responsive to the request to write content to the guest physical memory address, write the content to the real physical memory address. In an example, depending on a snapshot generation policy, the instructions 1110 may further cause the compute node to write the data to a block of the stable storage based on a snapshot generation update policy. In an example, the instructions 1110 may further cause the computer node to mark the second entry as being immutable responsive to the data being written to the block of stable storage.

In accordance with example implementations, the kernel, responsive to the third request, writes the first content to the first real physical memory address and the first block address of stable storage. A particular advantage is that in-memory snapshots may be maintained and used in a distributed system, thereby enhancing the performance of operations to retrieve snapshots and avoiding relatively more expensive I/O transactions with stable storage.

In accordance with example implementations, the kernel, responsive to the second request, modifies the second entry to designate the second entry as being immutable. A particular advantage is that in-memory snapshots may be maintained and used in a distributed system, thereby enhancing the performance of operations to retrieve snapshots and avoiding relatively more expensive I/O transactions with stable storage.

In accordance with example implementations, the kernel, responsive to the fourth request, writes the second content to the second real physical memory address and the second block address of stable storage. A particular advantage is that in-memory snapshots may be maintained and used in a distributed system, thereby enhancing the performance of operations to retrieve snapshots and avoiding relatively more expensive I/O transactions with stable storage.

In accordance with example implementations, the kernel, responsive to a boot-up of a first computer node of the distributed system and responsive to a request to load a block from the stable storage during the boot-up, performs the following operations. The kernel, accesses the storage replica table, reads the second entry from the storage replica table and determines, based on the second entry, that content stored at the second real physical address is a clone of the block. The kernel handles the request to load the block responsive to the determination. A particular advantage is that in-memory snapshots may be maintained and used in a distributed system, thereby enhancing the performance of operations to retrieve snapshots and avoiding relatively more expensive I/O transactions with stable storage.

In accordance with example implementations, the kernel regulates how often entries correspond to newer versions of guest memory pages may be added to the storage replica table based on a snapshot generation policy. A particular advantage is that in-memory snapshots may be maintained and used in a distributed system, thereby enhancing the performance of operations to retrieve snapshots and avoiding relatively more expensive I/O transactions with stable storage.

In accordance with example implementations, the distributed system includes a plurality of hyper-kernels that are distributed over the plurality of computer nodes and form the kernel. The distributed system further includes a virtual machine that is distributed over the plurality of computer nodes and contains the guest operating system. A particular advantage is that in-memory snapshots may be maintained and used in a distributed system, thereby enhancing the performance of operations to retrieve snapshots and avoiding relatively more expensive I/O transactions with stable storage.

In accordance with example implementations, the distributed system includes a hypervisor that is hosted by the first computer node and forms the kernel. The distributed system further includes a virtual machine that is hosted by the first computer node and contains the guest operating system. A particular advantage is that in-memory snapshots may be maintained and used in a distributed system, thereby enhancing the performance of operations to retrieve snapshots and avoiding relatively more expensive I/O transactions with stable storage.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A distributed system comprising:

a plurality of computer nodes;

wherein a first computer node of the plurality of computer nodes comprises a hardware-based processor that:

executes a program that provides a first request to write a first content to a guest virtual memory address and a second request to write a second content to the guest virtual memory address;

executes a guest operating system that:

responsive to the first request, provides a third request to write the first content to a guest physical memory address, wherein the first content corresponds to a first version of a content stored at the guest physical memory address; and responsive to the second request, provides a fourth request to write the second content to the guest physical memory address, wherein the second content corresponds to a second version of the content stored at the guest physical memory address; and executes a kernel that:

responsive to the third request, stores a first entry in a storage replica table associating the guest physical memory address with a first real physical memory address of a physical memory, a first block address of a stable storage and the first version, wherein the stable storage is constructed to allow atomic writes to the stable storage, and wherein the stable storage is separate from the physical memory; and responsive to the fourth request, stores a second entry in the storage replica table associating the guest physical memory address with a second real physical memory address, a second block address of stable storage and the second version.

2. The distributed system of claim 1, wherein the kernel, responsive to the third request, writes the first content to the first real physical memory address and the first block address of stable storage.

3. The distributed system of claim 2, wherein the kernel, responsive to the fourth request, modifies the second entry to designate the second entry as being immutable.

4. The distributed system of claim 1, wherein the kernel, responsive to the fourth request, writes the second content to the second real physical memory address and the second block address of stable storage.

5. The distributed system of claim 1, wherein the kernel, responsive to a boot-up of a first computer node of the plurality of computer nodes and responsive to a request to load a block from the stable storage during the boot-up:

accesses the storage replica table;

reads the second entry from the storage replica table;

determines, based on the second entry, that content stored at the second real physical memory address is a clone of the block; and handles the request to load the block responsive to the determination.

6. The distributed system of claim 1, wherein the guest physical memory address corresponds to a given guest memory page of guest memory pages, and wherein the kernel regulates how often entries corresponding to newer versions of the guest memory pages may be added to the storage replica table based on a snapshot generation policy.

7. The distributed system of claim 1, further comprising:

a plurality of hyper-kernels distributed over the plurality of computer nodes and forming the kernel; and a virtual machine distributed over the plurality of computer nodes and containing the guest operating system.

8. The distributed system of claim 1, further comprising:

a hypervisor hosted by the first computer node and forming the kernel; and a virtual machine hosted by the first computer node and containing the guest operating system.

9. A method comprising:

creating, by a kernel of a distributed system, entries in a storage replica table associated with a guest physical memory address;

storing, by the kernel, data in the entries associating the entries with respective versions of a content stored at the guest physical memory address;

storing, by the kernel, data in the entries associating the entries with respective stable storage block addresses of a stable storage, wherein the stable storage is constructed to allow atomic writes to the stable storage;

storing, by the kernel, data in the entries associating the entries with respective real physical memory addresses of a physical memory separate from the stable storage;

receive a read request provided by a program instance to read content associated with a first version of the respective versions; and responsive to the read request:

accessing, by the kernel, the storage replica table;

responsive to accessing the storage replica table, identifying, by the kernel, a first entry of the entries associated with the first version, the first entry containing data associating the first entry with a first real physical memory address of the respective real physical memory addresses; and reading, by the kernel, data from the first real physical memory address.

10. The method of claim 9, further comprising creating, by the kernel, additional entries in the storage replica table associated with additional guest physical memory addresses.

11. The method of claim 9, further comprising:

storing, by the kernel, data in the first entry designating the first entry as being immutable.

12. The method of claim 9, further comprising:

restoring, by the program instance, content for a guest virtual memory corresponding to the first version.

13. The method of claim 9, further comprising:

comparing, by the program instance, first content for a guest virtual memory corresponding to the first version to second content for the guest virtual memory corresponding to a second version of the versions.

14. The method of claim 9, further comprising:

determining, by the program instance, changes between first content for a guest virtual memory address corresponding to the first version and second content for the guest virtual memory address corresponding to a second version of the versions;

correlating, by the program instance, the changes with a system event; and detecting, by the program instance, a security attack based on the correlation.

15. The method of claim 9, further comprising:

creating a snapshot of the guest physical memory address associated with the first version, wherein the creating comprises mirroring the data read from the first real physical memory address to a second real physical memory address.

16. A non-transitory machine-readable storage medium that stores instructions that, when executed by a first computer node of a distributed system, cause the first computer node to, responsive to a request, from a guest operating system, to write content to a guest physical memory address:

access a storage replica table, wherein the storage replica table comprises a first entry corresponding to a first snapshot version for the guest physical memory address;

create a second entry for the storage replica table;

store data in the second entry designating the second entry as corresponding to a second snapshot version for the guest physical memory address;

store data in the second entry associating the guest physical memory address with a block address of a stable storage, wherein the stable storage is constructed to allow atomic writes to the stable storage;

store data in the second entry associating the guest physical memory address with a real physical memory address of a physical memory, wherein the physical memory is separate from the stable storage; and write the content to the real physical memory address.

17. The storage medium of claim 16, wherein the instructions, when executed by the first compute node further cause the first computer node to, responsive to a boot-up of the first computer node:

responsive to a request to load a block from the stable storage to a second guest physical memory address associated with the first computer node, access the storage replica table to determine whether a clone of the block is stored at a second real physical memory address; and process the request to load the block from the stable storage based on a result of the determination of whether the clone of the block is stored at the second real physical memory address.

18. The storage medium of claim 16, wherein the instructions, when executed by the first compute node, further cause the first computer node to, responsive to the request, write the content to the block address of the stable storage.

19. The storage medium of claim 16, wherein the instructions, when executed by the first compute node, further cause the first computer node to, responsive to the request, determine whether to write the content to the block address of the stable storage based on a snapshot generation policy.

20. The storage medium of claim 16, wherein the instructions, when executed by the first compute node, further cause the first computer node to perform at least one additional write to the real physical memory address, and subsequent to performing the at least one additional write, write a content associated with the real physical memory address to the block address of the stable storage.

* * * * *